(12) United States Patent
O'Connell et al.

(10) Patent No.: US 8,086,994 B2
(45) Date of Patent: Dec. 27, 2011

(54) USE OF RAS PROFILE TO INTEGRATE AN APPLICATION INTO A TEMPLATABLE SOLUTION

(75) Inventors: Margaret M. O'Connell, Allston, MA (US); Joyce C. Graham, Newton, MA (US); Dmitri M. Grigoriev, Medford, MA (US); Hanna Russo, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 11/321,542

(22) Filed: Dec. 29, 2005

(65) Prior Publication Data
US 2007/0234273 A1 Oct. 4, 2007

(51) Int. Cl.
*G06F 9/44* (2006.01)
(52) U.S. Cl. .......... 717/104; 717/100; 717/120
(58) Field of Classification Search ........... 717/100–108
See application file for complete search history.

(56) References Cited

U.S. PATENT DOCUMENTS

| | | | |
|---|---|---|---|
| 5,778,368 A | 7/1998 | Hogan et al. | |
| 5,867,709 A * | 2/1999 | Klencke | 717/111 |
| 6,167,564 A * | 12/2000 | Fontana et al. | 717/104 |
| 6,349,404 B1 | 2/2002 | Moore et al. | |
| 6,405,364 B1 | 6/2002 | Bowman-Amuah | |
| 6,697,819 B2 | 2/2004 | Boudreau | |
| 6,785,882 B1 | 8/2004 | Goiffon et al. | |
| 6,931,624 B1 * | 8/2005 | Snider | 717/108 |
| 7,152,224 B1 | 12/2006 | Kaler et al. | |
| 7,318,216 B2 * | 1/2008 | Diab | 717/108 |
| 2002/0032626 A1 | 3/2002 | DeWolf et al. | |
| 2002/0087947 A1 | 7/2002 | Kwon et al. | |
| 2003/0046282 A1 | 3/2003 | Carlson et al. | |
| 2003/0182211 A1 | 9/2003 | Sakurazawa et al. | |
| 2003/0182470 A1 | 9/2003 | Carlson et al. | |
| 2003/0233365 A1 | 12/2003 | Schmit et al. | |
| 2004/0034860 A1 * | 2/2004 | Fernando et al. | 719/315 |
| 2004/0177335 A1 | 9/2004 | Beisiegel et al. | |
| 2004/0249728 A1 | 12/2004 | Wu | |
| 2004/0268295 A1 | 12/2004 | Culter | |
| 2005/0080640 A1 | 4/2005 | Bhaskaran et al. | |
| 2005/0138603 A1 | 6/2005 | Cha et al. | |

(Continued)

FOREIGN PATENT DOCUMENTS

JP 2004362430 A 12/2004

OTHER PUBLICATIONS

RFC Submitted to OMG Reusable Asset Specification (RAS), Oct. 12, 2003, Object Management Group, pp. 1-110.*

(Continued)

*Primary Examiner* — Tuan Dam
*Assistant Examiner* — Todd Aguilera
(74) *Attorney, Agent, or Firm* — Raymond Szeto; Hoffman Warnick LLC

(57) ABSTRACT

The present invention provides a standardized way to incorporate any new or legacy application into a templatable solution by using Reusable Asset Specification (RAS) profile features. A method in accordance with an embodiment of the present invention includes: providing a default RAS profile for a templatable RAS asset corresponding to the application; and adding at least one extension to the default RAS profile, the at least one extension including a templatable implementation extension for implementing a templatable interface.

15 Claims, 3 Drawing Sheets

U.S. PATENT DOCUMENTS

| | | | |
|---|---|---|---|
| 2005/0268232 | A1 | 12/2005 | Stienhans et al. |
| 2006/0005163 | A1* | 1/2006 | Huesken et al. ............... 717/107 |
| 2006/0089828 | A1 | 4/2006 | Larsen et al. |
| 2007/0022028 | A1* | 1/2007 | Wulfert et al. ................... 705/35 |
| 2007/0022106 | A1 | 1/2007 | Brandt et al. |
| 2007/0150852 | A1* | 6/2007 | Balderas et al. ............... 717/104 |
| 2008/0065750 | A1* | 3/2008 | O'Connell et al. ............ 709/223 |

OTHER PUBLICATIONS

Bohrer, K. et al., The San Francisco Project: An Object Oriented Framework Approach to Building Business Applications, Twenty First Annual Computer Software and Applications Conference, 1997, pp. 416-424.*

Larsen, G., Pattern Solutions: Patterns with RAS [online], Apr. 2004 [retrieved Jan. 28, 2011], Retrieved from Internet: <http://patterns-wg.fuka.info.waseda.ac.jp/event/ps2004/grant-larsen.pdf>, pp. 1-39.*

Larsen, G., Asset Based Development [online], Nov. 2003 [retrieved Jan. 28, 2011], Retrieved from Internet: <http://xml.coverpages.org/Larsen-RAS200311.pdf>, pp. 1-45.*

IBM Corporation, "Association Relationships", 2005 [retrieved Aug. 27, 2011], Retrieved from Internet: <http://publib.boulder.ibm.com/infocenter/rtnlhelp/v6r0m0/index.jsp?topic=%2Fcom.ibm.xtools.modeler.doc%2Ftopics%2Fcassn.html>, p. 1.*

USPTO, "Office Action", Notification Date Dec. 15, 2008, U.S. Appl. No. 11/530,141, filed Sep. 8, 2006.

USPTO, "Final Office Action", Notification Date Jun. 11, 2009, U.S. Appl. No. 11/530,141, filed Sep. 8, 2006.

Magrogan, P.J. et al. "Object-oriented Methodology and Architecture for Reuse (OMAR)". Conference Proceedings, Object Technology Centers, Baltimore, MD, USA (Jun. 23-25, 1999), pp. 201-226.

Natu, S. et al. "Digital Asset Management Using a Native XML Database Implementation". *CITC4'03*, Oct. 16-18, 2003, pp. 237-241.

Levine, T. et al. "Reusable Software Components". Ada Letters, Jul./Aug. 1998, vol. XVIII, No. 4, pp. 32-46.

Spyns, P. et al. "Data modelling versus Ontology engineering". SIGMOD Record, vol. 31, No. 4, Dec. 2002, pp. 12-17.

O'Connell et al., U.S. Appl. No. 11/321,857, filed Dec. 29, 2005, Office Action dated Aug. 7, 2009, 21 pages.

USPTO, "Final Office Action", U.S. Appl. No. 11/321,857, Notification Date Jan. 25, 2010, 28 pages.

Todd Aguilera, USPTO Office Action, U.S. Appl. No. 11/321,857, Notification Date Oct. 6, 2011, 31 pages.

\* cited by examiner

USE OF RAS PROFILE TO INTEGRATE AN APPLICATION INTO A TEMPLATABLE SOLUTION

BACKGROUND OF THE INVENTION

1. Field of the Invention

The present invention generally relates to software applications, and more specifically relates to the use of a Reusable Asset Specification (RAS) profile to integrate an application into a templatable solution.

2. Related Art

There are many applications used by customers that are not integrated into larger system solutions, or at least not in a standard way. Thus, there is a need for a standardized way to incorporate any new or legacy application into a templatable solution.

SUMMARY OF THE INVENTION

The present invention provides a standardized way to incorporate any new or legacy application into a templatable solution by using Reusable Asset Specification (RAS) profile features.

A first aspect of the present invention is directed to a method for integrating an application into a templatable solution, comprising: providing a default Reusable Asset Specification (RAS) profile for a templatable RAS asset corresponding to the application; and adding at least one extension to the default RAS profile, the at least one extension including a templatable implementation extension for implementing a templatable interface.

A second aspect of the present invention is directed to a system for integrating an application into a templatable solution, comprising: a system for providing a default RAS profile for a templatable RAS asset corresponding to the application; and a system for adding at least one extension to the default RAS profile, the at least one extension including a templatable implementation extension for implementing a templatable interface.

A third aspect of the present invention is directed to a program product stored on a computer readable medium for integrating an application into a templatable solution, the computer readable medium comprising program code for performing the steps of: providing a default RAS profile for a templatable RAS asset corresponding to the application; and adding at least one extension to the default RAS profile, the at least one extension including a templatable implementation extension for implementing a templatable interface.

A fourth aspect of the present invention is directed to a method for deploying an application for integrating an application into a templatable solution, comprising: providing a computer infrastructure being operable to: provide a default RAS profile for a templatable RAS asset corresponding to the application; and add at least one extension to the default RAS profile, the at least one extension including a templatable implementation extension for implementing a templatable interface.

A fifth aspect of the present invention is directed to computer software embodied in a propagated signal for integrating an application into a templatable solution, the computer software comprising instructions to cause a computer system to perform the functions of: providing a default RAS profile for a templatable RAS asset corresponding to the application; and adding at least one extension to the default RAS profile, the at least one extension including a templatable implementation extension for implementing a templatable interface.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

Figure 1:
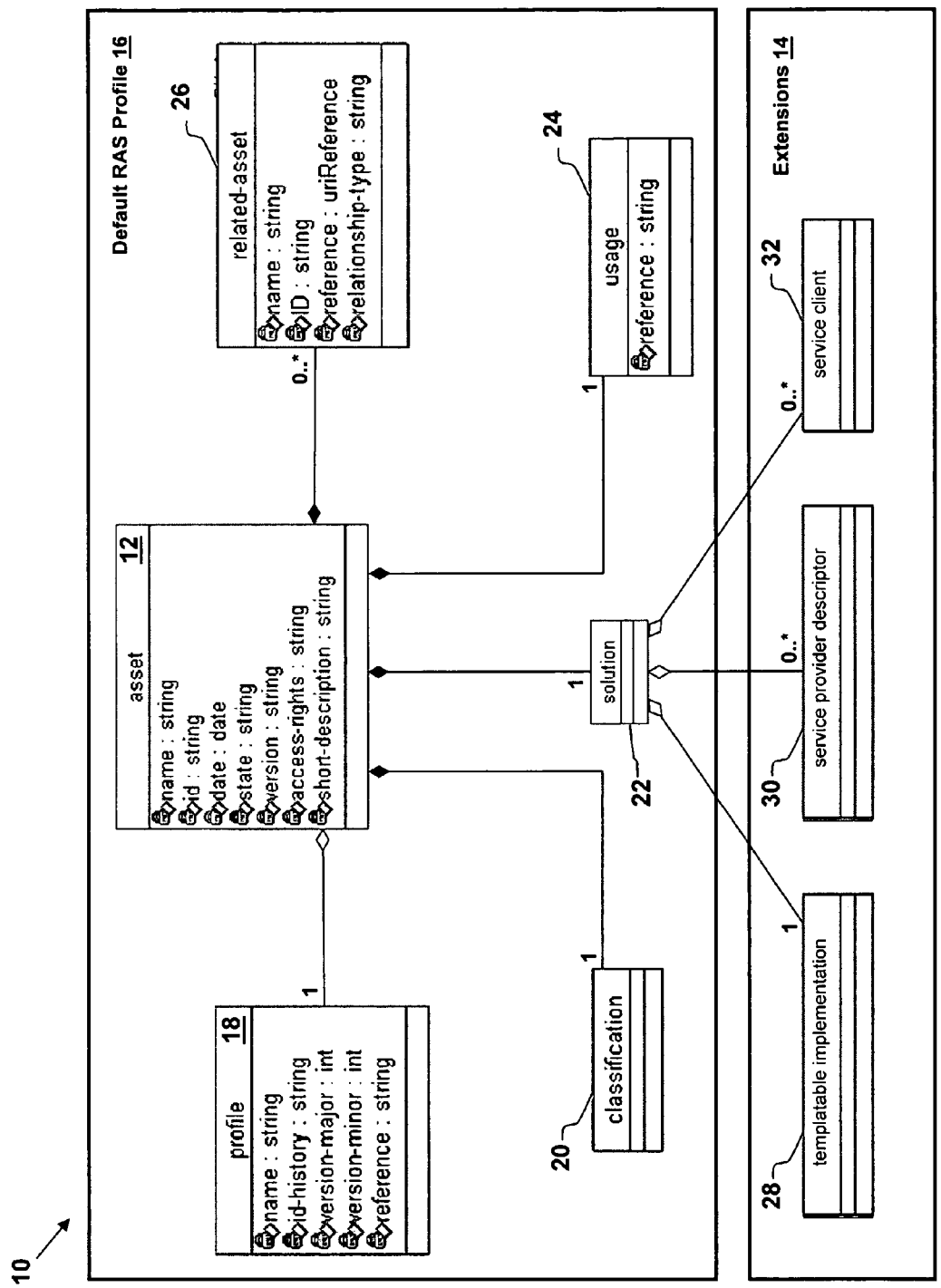
FIG. 1 depicts an illustrative UML model of a templatable RAS asset in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The Reusable Asset Specification (RAS) defines a standard way to package reusable software assets. A reusable software asset is, broadly speaking, any cohesive collection of artifacts that solve a specific problem or set of problems encountered in the software development life cycle. A reusable software asset is created with the intent of reuse. A reusable asset is distinguished from other artifacts or collections of artifacts used in the software development life cycle by its packaging. A reusable asset's packaging is simply the set of files that implement the solution and a structured set of meta information that defines and describes the reusable asset as a whole.

In the following description of the present invention, it is assumed that the reader has an understanding of RAS. Accordingly, a detailed description of RAS is not included herein.

The present invention provides a standardized way to incorporate any new or legacy software application into a templatable solution. An illustrative Unified Modeling Language (UML) model 10 for a templatable RAS asset 12 (corresponding to an application) in accordance with an embodiment of the present invention is depicted in FIG. 1. The templatable RAS asset 12 of the present invention includes the following aspects:

1. Implementation of a templatable interface;
2. [Optional] Specification and publication of any service (s) that it provides to other template participants;
3. [Optional] Specification of services which it uses; and
4. [Optional] External bindings for its points of variability.

In order for the templatable RAS asset 12 to provide the above-described aspects, the present invention provides extensions 14 to the default RAS profile 16 of the templatable RAS asset 12. As known in the art, the default RAS profile 16 includes a plurality of classes including profile 18, classification 20, solution 22, usage 24, and related-asset 26. The profile 18 identifies the particular type of templatable RAS asset 12 being described. The classification 20 contains descriptors which classify the key characteristics and behaviors of the templatable RAS asset 12. The solution 22 contains references to the artifact(s) 26 included in the templatable RAS asset 12. The usage 24 provides information regarding how to apply/use the templatable asset RAS 12. The related-asset 26 describes the relationships (if any) between the templatable asset RAS 12 and other RAS assets.

In order for the templatable RAS asset 12 to implement a templatable interface, the present invention adds a templatable implementation extension 28 to the default RAS profile 16. As shown in FIG. 1, the templatable implementation extension 28 is an extension to the solution 22 in the default RAS profile 16. The basic implementation of a templatable interface as provided in the templatable implementation extension 28 includes the following:

1) Basic lifecycle methods such as create, delete, and update; and
2) At least one method to allow a participating component to describe itself (a.k.a. serialize itself into the template).

In order for the templatable RAS asset 12 to be a service provider, the present invention adds a service provider extension 30 to the default RAS profile 16. The service provider extension 30 is also an extension to the solution 22 in the default RAS profile 16. An example of a service which a templatable RAS asset 12 could provide is a Community service such as that found in IBM Workplace products. In an email application, examples of services which could be provided include calendar services, send e-mail services, etc. The classification 20 in the default RAS profile 16 could also be used to specify the service(s) provided.

In order for the templatable RAS asset 12 to specify the services which it uses, the present invention adds a service client extension 32 to the default RAS profile 16. The service client extension 32 is also an extension to the solution 22 in the default RAS profile 16. An example of a service client which a templatable RAS asset 12 could use is a Community service such as that found in the IBM Workplace products. For example, a templatable RAS asset 12 which provides a document service could use Community to define its roles such as reader and author. As another example, a templatable RAS asset 12 could use a basic storage service, for example to store data (e.g., e-mail data) generated by an application.

The default RAS profile 16 already includes a way to provide external bindings for the points of variability of a templatable RAS asset 12. In particular, the solution 22 contains references to the artifact(s) included in the templatable RAS asset 12. As known in the art, an artifact is a work product that can be created, stored and manipulated by asset producers/consumers and by tools. An artifact may comprise, for example, requirements, models, code, tests, documents, etc. An artifact includes a variability-point class which defines points of customization that can be altered by a customer of the templatable RAS asset 12. Each variability-point describes where and what in an artifact can be modified.

Figure 2:
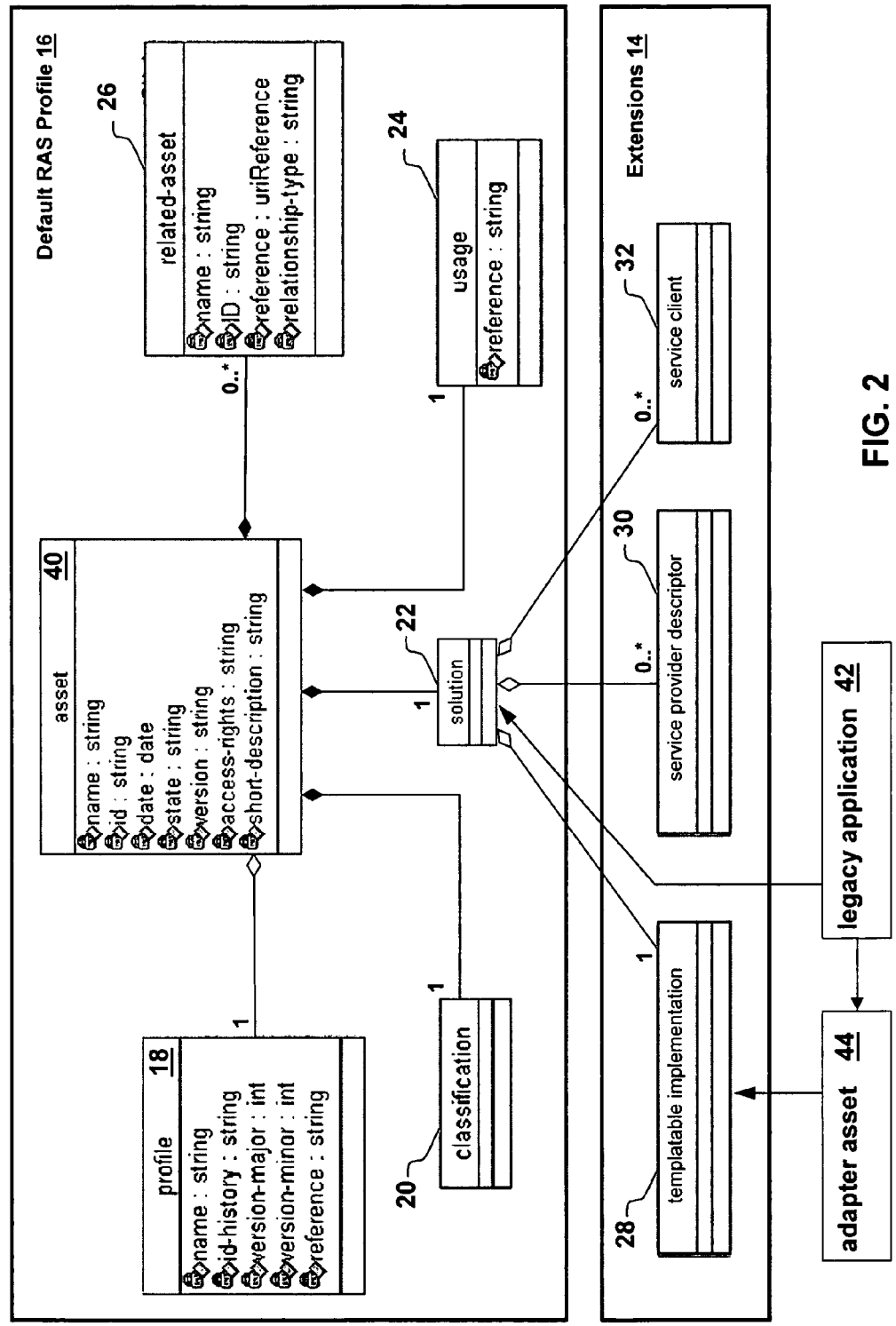
FIG. 2 depicts an illustrative UML model of a templatable RAS asset in accordance with another embodiment of the present invention.

In accordance with the present invention, a new type of RAS asset can be provided to create a templatable RAS asset for a legacy application to allow its full participation in a templatable solution. As illustrated in FIG. 2, this new RAS asset 40 appears very similar to the templatable RAS asset 12 described above. One difference is that the solution 22 of the new RAS asset 40 also references the legacy application 42. In addition, the templatable implementation extension 28 of the solution 22 of the RAS asset 40 references an "adapter" RAS asset 44 to implement the templatable interface on behalf of the legacy application 42. As known in the art, such an adapter RAS asset 44 is used to "adapt" one interface for an application into an interface that a client expects (e.g., by wrapping its own interface around the interface of an already existing application), thereby allowing applications to work together that normally could not because of incompatible interfaces.

Figure 3:
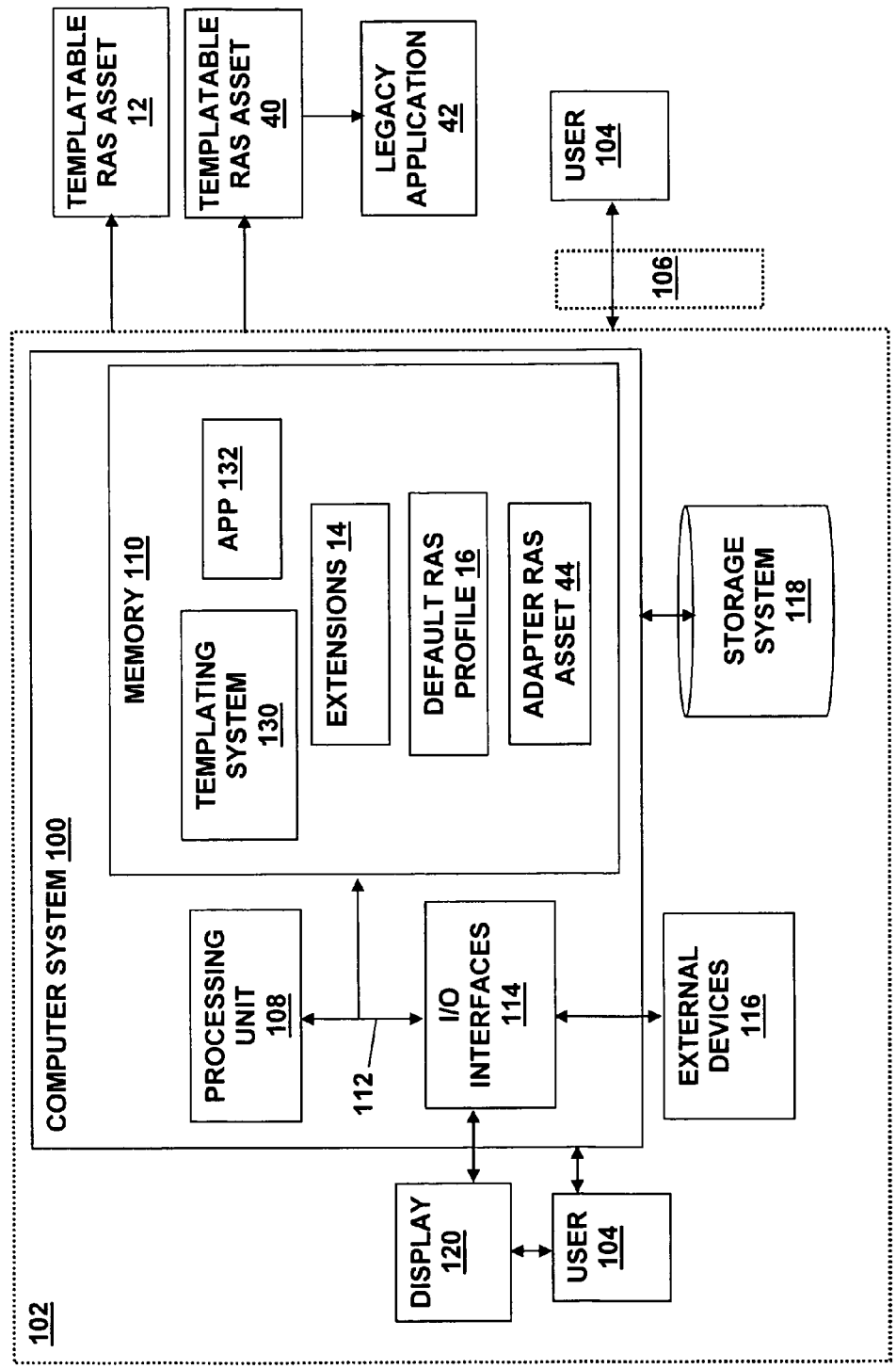
FIG. 3 depicts an illustrative computer system for implementing embodiment(s) of the present invention.

A computer system 100 for integrating an application into a templatable solution using a RAS profile in accordance with an embodiment of the present invention is depicted in FIG. 3. The computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider. That is, a service provider can be used to provide a service for the integration of an application into a templatable solution using a RAS profile in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as a templating system 130, stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 3 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a templating system 130 for integrating an application 132 into a templatable solution using a RAS profile in accordance with an embodiment of the present invention, as described above. In particular, the templating system 130 provides a templatable RAS asset 12 by adding extensions 14 to the default RAS profile 16 of the application 132. As detailed with regard to FIG. 1, the extensions 14 include a templatable implementation extension 28, a service provider extension 30, and a service client extension 32. In order to provide a templatable RAS asset 40 for a legacy application 42, the solution 22 (FIG. 2) of the templatable RAS asset 40 also references the legacy application 42. In addition, the templatable implementation extension 28 of the solution 22 of the templatable RAS asset 40 references an adapter RAS asset 44 to implement the templatable interface on behalf of the legacy application 42.

The present invention can be offered as a business method on a subscription or fee basis. For example, one or more components of the present invention can be created, maintained, supported, and/or deployed by a service provider that offers the functions described herein for customers. That is, a service provider can be used to provide a service for the integration of an application into a templatable solution using a RAS profile in accordance with the present invention.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for integrating a legacy application into a templatable solution, comprising:
   obtaining a default Reusable Asset Specification (RAS) profile for a templatable RAS asset corresponding to the legacy application; and
   adding, using at least one computing device, at least one extension to the default RAS profile, the at least one extension including a templatable implementation extension for implementing a templatable interface;
   wherein the templatable implementation extension is directly associated with a solution class in the default RAS profile and references an adapter RAS asset;
   wherein the solution class in the default RAS profile references the legacy application; and
   wherein the templatable implementation extension references the adapter RAS asset.

2. The method of claim 1, wherein the templatable implementation extension includes lifecycle methods.

3. The method of claim 1, wherein the templatable implementation extension includes a description method.

4. The method of claim 1, wherein the at least one extension further comprises a service provider extension.

5. The method of claim 1, wherein the at least one extension further comprises a service client extension.

6. A system for integrating a legacy application into a templatable solution, comprising:
   at least one computing device, including:
   a system for obtaining a default Reusable Asset Specification (RAS) profile for a templatable RAS asset corresponding to the legacy application; and a system for adding at least one extension to the default RAS profile, the at least one extension including a templatable implementation extension for implementing a templatable interface;

wherein the templatable implementation extension is directly associated with a solution class in the default RAS profile and references an adapter RAS asset;

wherein the solution class in the default RAS profile references the legacy application; and wherein the templatable implementation extension references the adapter RAS asset.

7. The system of claim 6, wherein the templatable implementation extension includes lifecycle methods.

8. The system of claim 6, wherein the templatable implementation extension includes a description method.

9. The system of claim 6, wherein the at least one extension further comprises a service provider extension.

10. The system of claim 6, wherein the at least one extension further comprises a service client extension.

11. A program product stored on a non-transitory computer readable storage medium for integrating a legacy application into a templatable solution, the computer readable medium comprising program code for:

obtaining a default Reusable Asset Specification (RAS) profile for a templatable RAS asset corresponding to the legacy application; and adding at least one extension to the default RAS profile, the at least one extension including a templatable implementation extension for implementing a templatable interface;

wherein the templatable implementation extension is directly associated with a solution class in the default RAS profile and references an adapter RAS asset;

wherein the solution class in the default RAS profile references the legacy application; and wherein the templatable implementation extension references the adapter RAS asset.

12. The program product of claim 11, wherein the templatable implementation extension includes lifecycle methods.

13. The program product of claim 11, wherein the templatable implementation extension includes a description method.

14. The program product of claim 11, wherein the at least one extension further comprises a service provider extension or a service client extension.

15. A system for integrating a legacy application into a templatable solution, comprising:

means for obtaining a default Reusable Asset Specification (RAS) profile for a templatable RAS asset corresponding to the legacy application; and means for adding at least one extension to the default RAS profile, the at least one extension including a templatable implementation extension for implementing a templatable interface;

wherein the templatable implementation extension is directly associated with a solution class in the default RAS profile and references an adapter RAS asset;

wherein the solution class in the default RAS profile references the legacy application; and wherein the templatable implementation extension references the adapter RAS asset.

\* \* \* \* \*